United States Patent
Tamagawa et al.

(10) Patent No.: US 6,621,062 B1
(45) Date of Patent: Sep. 16, 2003

(54) REAR-VIEW MIRROR DRIVING AND CONTROLLING MECHANISM

(75) Inventors: Kenichi Tamagawa, Miyagi-ken (JP); Tsukasa Mizusawa, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 189 days.

(21) Appl. No.: 09/709,697

(22) Filed: Nov. 10, 2000

(30) Foreign Application Priority Data

Nov. 22, 1999 (JP) ............................................ 11-331844

(51) Int. Cl.⁷ ............................................... H01J 40/14
(52) U.S. Cl. ......................... 250/206; 307/10.1; 701/49
(58) Field of Search ................................ 250/206, 216, 250/221; 307/10.1; 701/49; 359/601, 604, 607, 610, 229, 230

(56) References Cited

U.S. PATENT DOCUMENTS

| | | | | |
|---|---|---|---|---|
| 4,871,953 A | * | 10/1989 | Anstee | 318/466 |
| 5,624,176 A | * | 4/1997 | O'Farrell et al. | 362/494 |
| 5,959,367 A | | 9/1999 | O'Farrell et al. | 340/903 |

FOREIGN PATENT DOCUMENTS

JP    Hei 6-270741    9/1994

OTHER PUBLICATIONS

Whitten et al., "Rear View Mirror Tilt Control" (Mar. 2, 2002) U.S. Patent application Publication, pp 1–3.*

\* cited by examiner

*Primary Examiner*—David V. Bruce
*Assistant Examiner*—Courtney Thomas
(74) *Attorney, Agent, or Firm*—Brinks Hofer Gilson & Lione

(57) ABSTRACT

A rear-view mirror driving and controlling mechanism comprising a rear-view mirror manipulator for moving the mirror angle position of the rear-view mirror, a reverse signal detector for generating reverse position signals when the transmission is shifted to the reverse position, a controller for moving the rear-view mirror angle on the basis of the operation status of a rear-view mirror manipulator and the detection result of the presence or absence of reverse position signals, a mirror angle detector for generating angle detection signals indicative of the mirror angle of the rear-view mirror, and a mirror angle storage for storing angle detection signals, wherein the controller stores the angle detection signals generated by the rear-view mirror angle detector into the mirror angle storage for each time the mirror angle position is adjusted at the time when the reverse detection signals are not generated, while moving down the rear-view mirror position angle at the time when the reverse detection signals are generated, and restoring the mirror angle to the original angle on the basis of the latest angle detection signals stored in the mirror angle storage at the time when the reverse detection signals are halted.

2 Claims, 3 Drawing Sheets

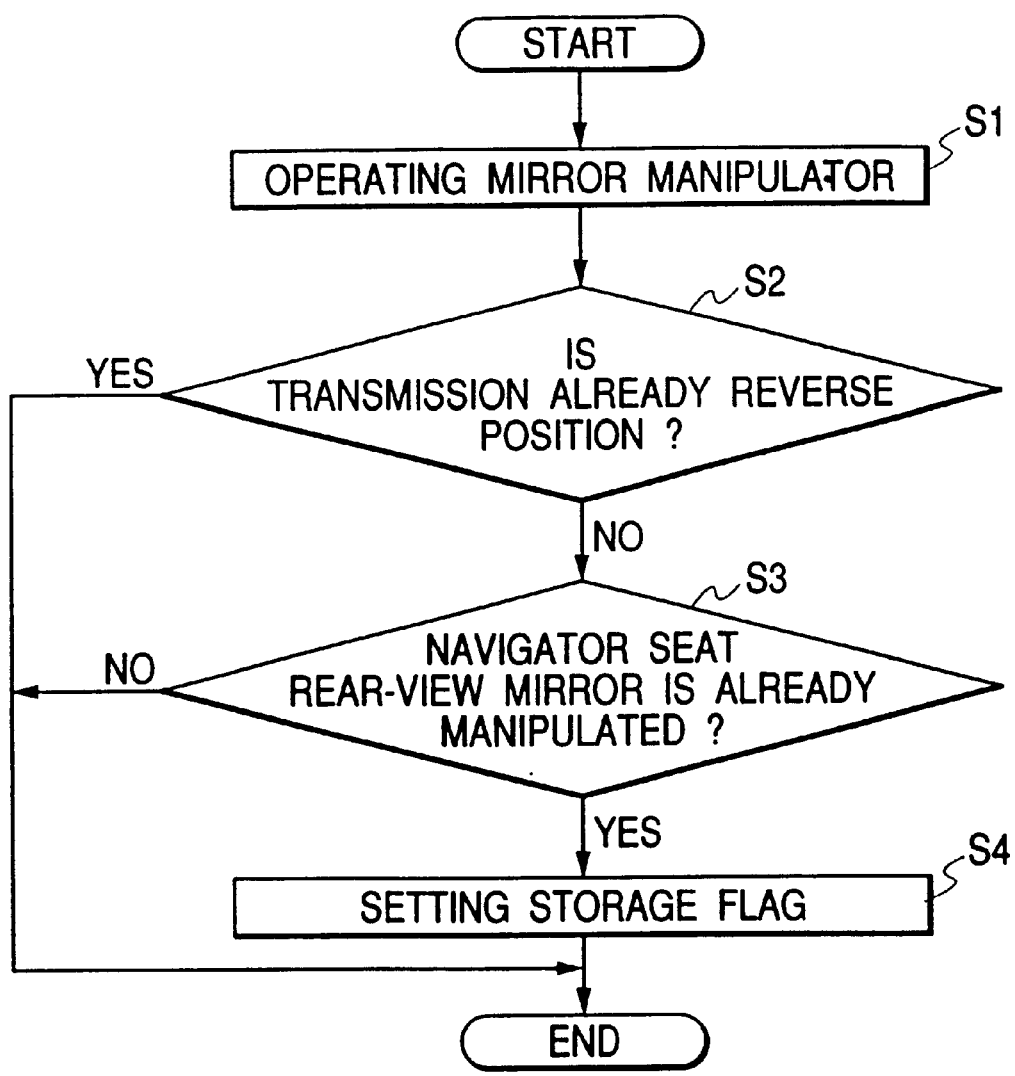

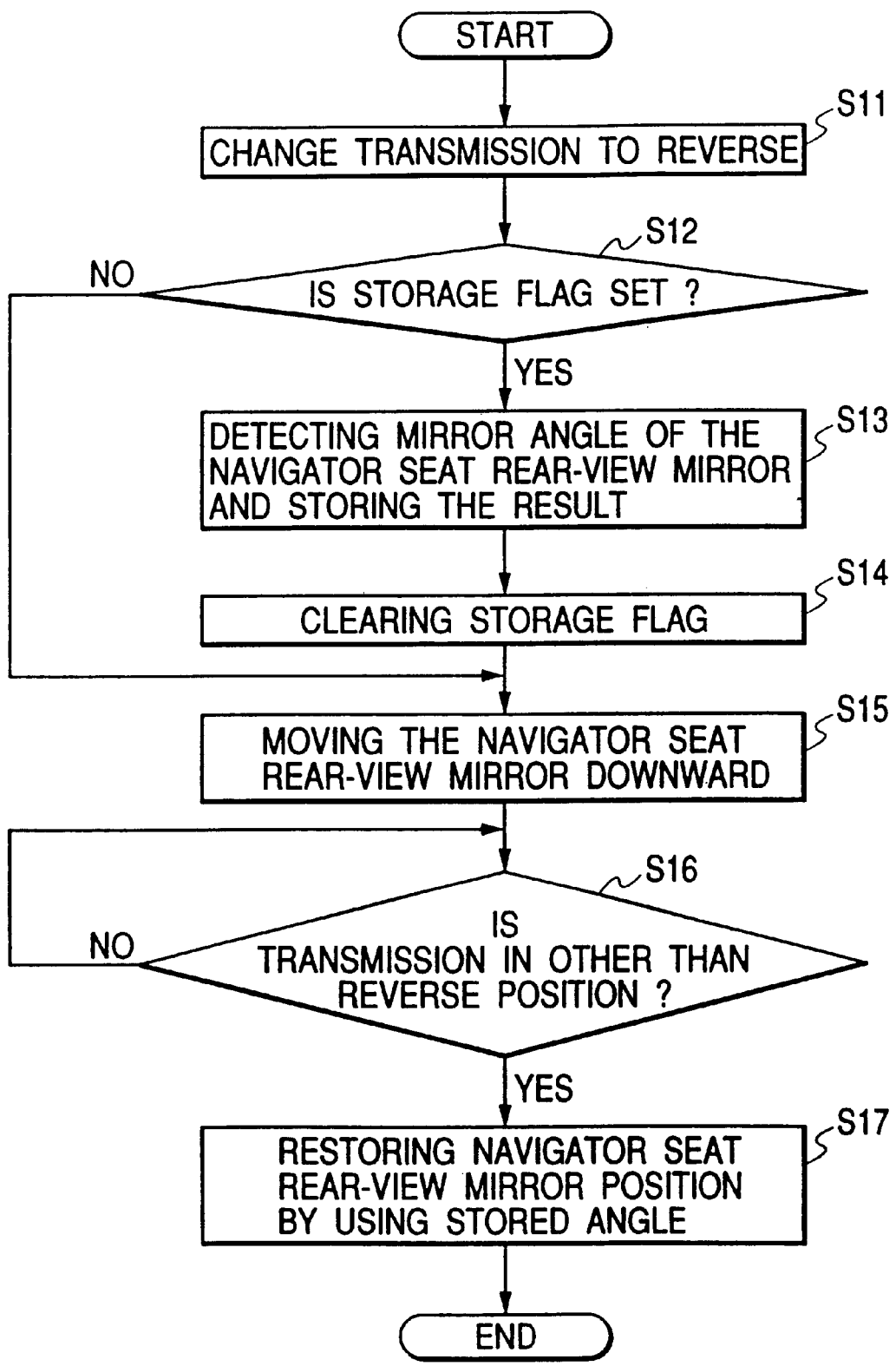

REAR-VIEW MIRROR DRIVING AND CONTROLLING MECHANISM

BACKGROUND OF THE INVENTION

1. Field of the Invention

The present invention relates to a rear-view mirror driving and controlling mechanism, and more particularly to a rear-view mirror driving and controlling mechanism, which will automatically move the angle position of the rear-view mirror to downward when the transmission of a vehicle is shifted to the reverse position for moving backward, and will restore the angle position of the rear-view mirror automatically to the original angle when the shift to the reverse position is released.

2. Description of the Related Art

In rear-view mirror driving and controlling mechanism of vehicles to date, there is known a mechanism which automatically moves down the rear-view mirrors. More specifically, to the rear-view mirror mounted on the passenger seat side of a vehicle when the vehicle moves starts to move backward so as to allow the driver to easily check to see the position of gutters placed on the shoulder of the road and the position of parking slot lines at the time of parking, and which automatically restores the angle position of the rear-view mirror to the angle position prior to moving it down when the vehicle stops moving backward.

The known rear-view mirror driving and controlling mechanism may comprise a manipulator member for selecting the rear-view mirror to be adjusted (for example the rear-view mirror on the passenger seat side), reverse position detector means for detecting the position of transmission of the vehicle shifted to the reverse position, rear-view mirror driving means for driving in a vertical direction the angle of rear-view mirror, controller means for moving down the angle position of the rear-view mirror by means of the rear-view mirror driver means when either one of rear-view mirrors is selected by the manipulator member (for example, the rear-view mirror on the passenger seat side) if the transmission is detected to shift to the reverse position by the reverse position detector means, and an open/close detector means for detecting the change in the position of driver seat side door from the closed position to the opened position or vice versa.

During the period after either one of rear-view mirrors is selected by the manipulator means, until the change in the driver seat side door position is detected by the open/close detector means, if the reverse position shift is detected by the reverse position detector means, the controller means will move down the angle position of the rear-view mirror by means of the rear-view mirror driver means. On the other hand, after either one of rear-view mirrors is selected by the manipulator means, when the change in the driver seat side door position is detected by the open/close detector means, if the reverse position shift is detected by the reverse position detector means, the controller will prevent the rear-view mirror from moving down by means of the rear-view mirror driving means.

Also, the known rear-view mirror driving and controlling mechanism as described above further comprises a sensor for detecting the angle position of the rear-view mirror and generating the angle information indicative of the detected result, and a memory for storing the angle information generated by the sensor.

In the controller means, when it is detected by the reverse position detecting means that the transmission of vehicle is shifted to the reverse position, the sensor will be driven to detect the angle position of the rear-view mirror to generate the angle information indicative of the detection result, to transmit thus generated angle information into the memory to store it therein, and then the angle information stored in the memory will be read out when the transmission is shifted to any position other than the reverse position so as to restore the angle position of the rear-view mirror from the downward direction to the original position on the basis of the read angle information.

The known rear-view mirror driving and controlling mechanism as described above moves downwardly the angle position of rear-view mirror when the transmission of vehicle is shifted to the reverse position while at the same time storing the angle information representative of the angle immediately before the downward movement into a memory, then restores the angle position of the rear-view mirror from the downward direction to the original position on the basis of the read angle information stored in the memory and representative of the mirror angle position before moving down, when the transmission is shifted to any position other than the reverse position. In the angle information indicative of the mirror angle position of the rear-view mirror there is a slight error included therein in general. Thus when storing into the memory the mirror angle of rear-view mirror including the error and then restoring the mirror angle position of rear-view mirror from the moved-down position to the original position by using the angle information read out from the memory, the known mechanism has the problem that it cannot restore the angle position of rear-view mirror completely to the original position. The mirror may be placed at an angle different from the original position by the amount of error included in the angle position information.

In such a case, when storing the angle position information including some error into the memory and then restoring the mirror angle position of rear-view mirror to the original position by using the angle position information read out from the memory including the error, namely moving the mirror position once or twice, the driver will recognize that the rear-view mirror is moved back to the original angle position since the amount of error is very small. However after repeating the rear-view mirror moving operation several times, the small amount of error will be accumulate to become a large amount of error, so that the driver can recognize that the rear-view mirror is not restored to the original angle position. The driver may then need to adjust the rear-view mirror angle position once again to the desired position.

With respect to this point, by providing a mirror angle detector of higher resolution for detecting the angle position of rear-view mirror and by providing a controller of higher precision so as to be capable of analyzing preciously the angle position information output from the mirror angle detector of higher resolution, the error included in the angle position information might be eliminated or reduced to a negligible value. However when using such high resolution mirror angle detector or high precision controller, the manufacturing cost of the rear-view mirror driving and controlling mechanism will increase, and the increased manufacturing cost in turn will increase the total cost of the unit vehicle.

SUMMARY OF THE INVENTION

The present invention has been made in view of the above circumstances and has an object to overcome the above problems and to provide a rear-view mirror driving and controlling mechanism for moving down the angle position of the rear-view mirror when the transmission of the vehicle is shifted to the reverse position, and for restoring the rear-view mirror to the original angle position when the transmission is again shifted to any other position than the reverse position in a positive manner, which can be made at lesser cost as well.

To achieve the object in accordance with the purpose of the invention, as embodied and broadly described herein, this invention provides a rear-view mirror driving and controlling mechanism, comprising a rear-view mirror mounted on a vehicle; a mirror manipulator for moving the angle of the rear-view mirror; a reverse position detector linked to a transmission of the vehicle for generating reverse position signals when the transmission is shifted into the reverse position; a controller for detecting the operation status of the mirror manipulator and the presence or absence of the reverse position signals to move the angle position of the rear-view mirror on the basis of detected results; a rear-view mirror angle detector for generating angle detection signals representative of the angle position of the rear-view mirror; and a rear-view mirror angle storage for storing the angle position detection signals; wherein the controller instructs the rear-view mirror angle detector to generate the angle position detection signals each time the angle position of the rear-view mirror is moved when the reverse position detection signals are not generated so as to store thus obtained angle position detection signals in the rear-view mirror angle storage, while the controller instructs to move down the angle position of the rear-view mirror when the reverse position detection signals are generated, and the controller instructs to restore the angle position of the rear-view mirror to the angle position stored in the rear-view mirror angle storage on the basis of the latest angle position detection signal.

In accordance with the configuration as described above, in performing the rear-view mirror turn and back operation that moves down the angle position of rear-view mirror when the transmission of vehicle is shifted to the reverse position and then restoring the rear-view mirror to the original and previously set angle position when thereafter the transmission is shifted to any other position than the reverse position, the rear-view mirror is moved back to the originally preset angle position on the basis of the latest angle position detection signal detected when the reverse detection signal is not output and stored in the rear-view mirror angle storage, so that the inventive mechanism assures that the slight error included in the angle position detection signal will not be accumulated if the rear-view mirror turn and back operation is iteratively repeated for a number of times, and that the angle position of rear-view mirror will be moved back to the angle position preset by the driver even when an inexpensive controlling system is adopted.

Also, in accordance with the present invention it is desirable that the rear-view mirror is mounted on the passenger seat side of the vehicle.

In this configuration, when the vehicle moves backward, the driver may clearly recognize the road condition of the passenger seat side that is a blind spot for the driver by moving down the rear-view mirror mounted on the passenger seat side of the vehicle.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention. In the drawings.

FIG. 2 is a flow chart illustrating the operation steps when a mirror manipulator is accessed in the rear-view mirror driving and controlling mechanism shown in FIG. 1; and FIG. 3 is a flow chart illustrating the operation steps of rear-view mirror turn and back sequence when the transmission is shifted temporarily to the reverse position in the rear-view mirror driving and controlling mechanism shown in FIG. 1.

DETAILED DESCRIPTION OF THE PREFERRED EMBODIMENTS

Figure 1:
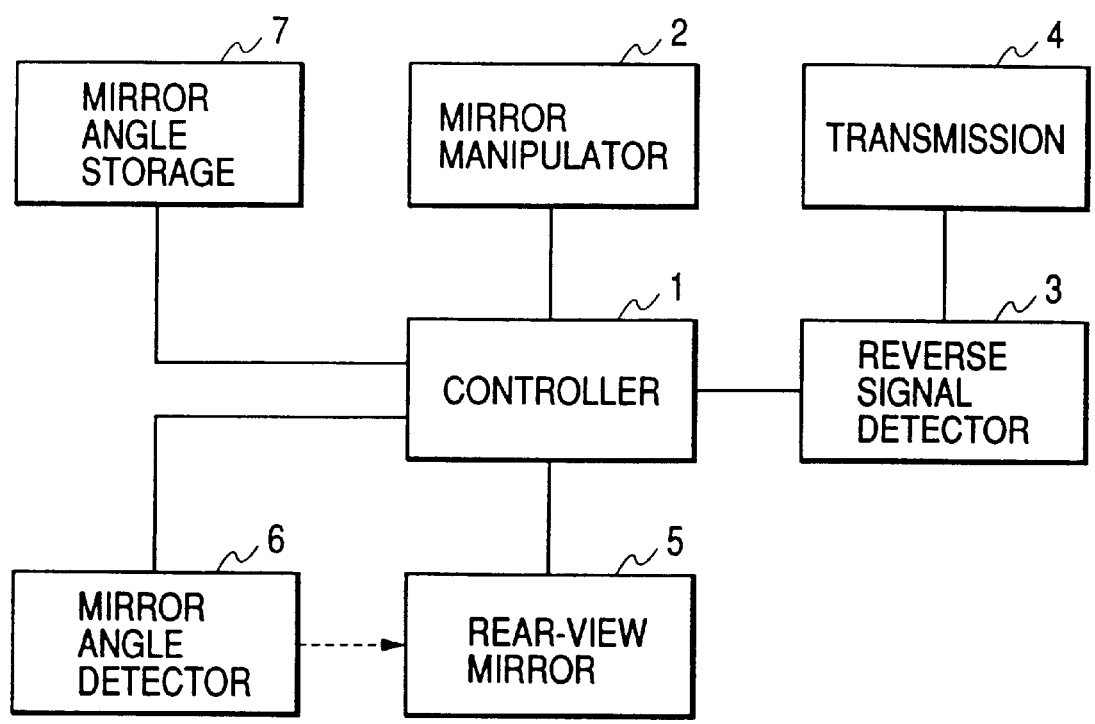
FIG. 1 is a schematic block diagram of a major configuration of the rear-view mirror driving and controlling mechanism in accordance with one preferred embodiment of the present invention.

A detailed description of one preferred embodiment embodying the present invention will now be given referring to the accompanying drawings.

Now referring to the drawings, FIG. 1 is a schematic block diagram of a major configuration of the rear-view mirror driving and controlling mechanism in accordance with one preferred embodiment of the present invention.

As shown in FIG. 1, the rear-view mirror driving and controlling mechanism of the present embodiment is comprised of a controller 1, a mirror manipulator 2, a reverse signal detector 3, a transmission 4, a rear-view mirror 5, a mirror angle detector 6, and a mirror angle storage 7. The controller 1 is connected to the mirror manipulator 2, reverse signal detector 3, rear-view mirror 5, mirror angle detector 6 and mirror angle storage 7, and the reverse signal detector 3 is coupled to the transmission 4.

In this case, the mirror manipulator 2 has a first manipulating unit for adjusting the mirror angle of the rear-view mirror 5 in horizontal and vertical direction respectively, and a second manipulating unit for expanding and retracting the rear-view mirror 5. The operation status of both the first manipulating unit and the second manipulating unit may be detected by the controller 1. The reverse signal detector 3 is coupled to the transmission 4 for detecting when the transmission 4 is shifted to the reverse position to supply reverse position signals to the controller 1. The rear-view mirror 5 is manipulated by the rear-view mirror position control signals supplied from the controller 1 to displace to a mirror position in the horizontal and/or vertical direction, also by the rear-view mirror expanding and retracting signals supplied from the controller 1 to be expanded and retracted. The mirror angle detector 6 is for detecting the mirror angle of the rear-view mirror 5 to generate the angle detecting signals indicative of the mirror angle position of the rear-view mirror 5 to be supplied to the controller 1. The mirror angle storage 7 stores the angle detecting signals generated by the mirror angle detector 6 under the control of the controller 1.

Next, referring to FIG. 2, there is shown a flow chart illustrating the operation steps when the mirror manipulator 2 is accessed in the rear-view mirror driving and controlling mechanism shown in FIG. 1 and referring to FIG. 3, there is shown a flow chart illustrating the operation steps of rear-view mirror 5 turn and back sequence when the transmission 4 is shifted temporarily to the reverse position in the rear-view mirror driving and controlling mechanism shown in FIG. 1.

Now the operation of the rear-view mirror driving and controlling mechanism shown in FIG. 1 will be described below with reference to the flow charts shown in FIG. 2 and FIG. 3. It is to be noted that in the following description the rear-view mirror 5 moved by the mirror manipulation is assumed to be the one mounted on the passenger seat side.

The steps of operation sequence when operating the mirror manipulator 2 as shown in FIG. 2 will be as follows:

At first, in step S1, when the driver operates the first manipulating unit of the mirror manipulator 2 to move the rear-view mirror 5 to a desirable angle position, the controller 1 will detect the operation status of the first manipulating unit of the mirror manipulator 2 to generate mirror angle position control signals for moving the rear-view mirror 5 to the desired angle position on the basis of the detection result.

Then, in step S2, the controller 1 will determine whether or not the transmission 4 is shifted to the reverse position at this point of time and reverse position signals are output from the reverse signal detector 3. If it is determined that the transmission 4 is shifted to any other position than the reverse position so that the reverse position signals are not output (N), the process proceeds to the next step S3, and if otherwise it is determined that the transmission 4 is shifted to the reverse position so that the reverse position signals are output (Y), the process sequence of this flow chart will terminate.

Next, in step S3, the controller 1 will determine whether or not the rear-view mirror 5 mounted on the passenger seat side is manipulated by the operation of the first manipulating unit of the mirror manipulator 2. If it is determined that the rear-view mirror 5 mounted on the passenger seat side is manipulated (Y), then the process step proceeds to the next step S4, if otherwise it is determined that the operation other than that of rear-view mirror 5 mounted on the passenger seat side is performed (N), then the process sequence of this flow chart will terminate.

Then, in step S4, the controller 1 will set a storage flag in its internal memory to terminate the process sequence of this flow chart.

Also, as shown in FIG. 3, the steps of operation sequence of rear-view mirror 5 turn and back when the transmission 4 is temporarily shifted to the reverse position will be as follows:

At first, in step S11, when the transmission 4 is shifted to the reverse position, the controller 1 will receive reverse position signals from the reverse signal detector 3.

Then, in step S12, the controller 1 will determine whether or not the storage flag in its internal memory is set at the time when receiving the reverse position signals. Thereafter if it is determined that the flag is set (Y), then the process proceeds to the next step S13, if otherwise it is determined that the flag is not set (N), then the process proceeds to step S15.

Next, in step S13, the controller 1 will drive the rear-view mirror angle detector 6 to detect the mirror angle of the rear-view mirror 5 of the passenger seat side, receive angle detection signals obtained by the detection, and supply the angle detection signals to the mirror angle storage 7 thereby to store them in the mirror angle storage 7.

Then, in step S14, the controller 1 will clear the storage flag set in the internal memory.

In step S15 that follows, the controller 1 will move down the rear-view mirror 5 of the passenger seat side such that the mirror angle moves downwardly. For the downward mirror angle, a predetermined angle set in the controller 1 will be used.

Next, in step S16, the controller 1 will determine whether or not the transmission 4 is now shifted to any other position from the reverse position, for example to the parking position, on the basis of the presence or absence of the reverse position signals supplied from the reverse signal detector 3. Thereafter, when it is determined that the transmission 4 is shifted to any other position than the reverse position on the basis of the halt of supply of the reverse position signals (Y), the process proceeds to the next step S17, if otherwise it is determined that the transmission 4 is still at the reverse position (N) then this step S16 will be iteratively repeated.

Then, in step S17, the controller 1 will read out the latest angle position detection signals stored in the mirror angle storage 7 to generate rear-view mirror position control signals in accordance with the angle detection signals. Thereafter, the controller 1 uses thus generated rear-view mirror position control signals to adjust the mirror angle of the rear-view mirror 5 of passenger seat side, to move the rear-view mirror to restore the mirror angle set by the latest operation of the mirror manipulator 2 by the driver from the downward position and terminates the process sequence of this flow chart.

The present invention may be embodied in other specific forms without departing from the spirit or essential characteristics thereof. For instance, although in the above description, an exemplary configuration that the mirror angle of the rear-view mirror 5 on the passenger seat side is moved has been described, the angle of the rear-view mirror mounted on the driver seat side may also be moved in addition to the rear-view mirror of the passenger seat side.

As have been described above, in accordance with the present invention, when performing the mirror angle moving operation where the mirror angle of the rear-view mirror is moved down to the downward direction when the transmission is shifted to the reverse position and thereafter the mirror angle of the rear-view mirror is restored to the originally set angle position at the time the transmission is shifted to any other position than the reverse position, the mirror angle is moved back to the originally set angle based on the latest angle detection signals stored in the mirror angle storage and detected when the reverse detection signals are not output. Thus in accordance with the present invention any slight error included in the angle detection signals will not be accumulated even when the mirror angle moving operation is iteratively repeated for a number of times, and the present invention ensures that the mirror angle can be restored to the angle originally preset by the driver.

What is claimed is:

1. A rear-view mirror driving and controlling mechanism, comprising
   a rear-view mirror mounted on a vehicle;
   a mirror manipulator for moving the angle of the rear-view mirror;
   a reverse signal detector linked to a transmission of the vehicle for generating reverse position signals when the transmission is shifted into the reverse position;
   a controller for detecting the operation status of the mirror manipulator and the presence or absence of the reverse position signals, and for moving the angle position of the rear-view mirror on the basis of detected results;
   a rear-view mirror angle detector for generating angle position detection signals representative of the angle position of the rear-view mirror; and
   a rear-view mirror angle storage for storing the angle position detection signals;

wherein the controller sets a memory flag each time the angle position of the rear-view mirror is moved by the mirror manipulator while the reverse position signals are not generated, the memory flag indicating that the angle position has been moved; instructs the angle position of the rear-view mirror to be moved to a predetermined rearward-viewing angle position, after storing the angle position detection signals obtained from the rear-view mirror angle detector in the rear-view mirror angle storage if the memory flag is set and without storing the angle position detection signals in the rear-view mirror angle storage if the memory flag is not set, when the reverse position signals are generated by the reverse position detector; and instructs the angle position of the rear-view mirror to be restored to the angle position stored in the rear-view mirror angle storage on the basis of the latest angle position detection signal when the reverse signal detector stops generating the reverse position signals.

2. A rear-view mirror driving and controlling mechanism set forth in claim 1, wherein the rear-view mirror is mounted on the passenger seat side of the vehicle.

* * * * *